(12) United States Patent
Wendorff et al.

(10) Patent No.: US 7,981,354 B2
(45) Date of Patent: Jul. 19, 2011

(54) PRODUCTION OF METAL NANO- AND MESOFIBERS

(75) Inventors: Joachim H. Wendorff, Marburg (DE); Andreas Greiner, Amöneburg (DE); Michael Bognitzki, Marburg (DE); Martin Graeser, Kunzell (DE)

(73) Assignee: Philipps-Universitat Marburg, Marburg (DE)

( * ) Notice: Subject to any disclaimer, the term of this patent is extended or adjusted under 35 U.S.C. 154(b) by 176 days.

(21) Appl. No.: 11/991,246

(22) PCT Filed: Aug. 25, 2006

(86) PCT No.: PCT/DE2006/001488
§ 371 (c)(1),
(2), (4) Date: Nov. 10, 2008

(87) PCT Pub. No.: WO2007/022770
PCT Pub. Date: Mar. 1, 2007

(65) Prior Publication Data
US 2009/0148701 A1   Jun. 11, 2009

(30) Foreign Application Priority Data
Aug. 25, 2005 (DE) .......................... 10 2005 040 422

(51) Int. Cl.
*D06M 10/00* (2006.01)
*H05B 7/00* (2006.01)

(52) U.S. Cl. ........................................... 264/465

(58) Field of Classification Search ............... 264/465
See application file for complete search history.

(56) References Cited

U.S. PATENT DOCUMENTS

| 2004/0067358 | A1* | 4/2004 | Kim ............................ 428/375 |
| 2004/0137225 | A1* | 7/2004 | Balkus et al. .................. 428/364 |
| 2006/0040168 | A1* | 2/2006 | Sridhar ........................... 429/40 |
| 2007/0035055 | A1* | 2/2007 | Gee et al. .................. 264/465 X |

OTHER PUBLICATIONS

J. Watthanaarun et al., "Titanium (IV oxide nanofibers by combined sol-gel and electrospinning techniques: preliminary report on effects of preparation conditions and secondary metal dopant", Science and Technology of Advanced Materials 6 (2005) 240-245.
C. Shao et al., "A novel method for making silica nanofibres by using electrspun fibres of polyvinylalcohol/silica composite as precursor", Nanotechnology 13 (2002) 635-637.
H. Dai et al., "A novel method for preparing ultra-fine alumina-borate oxide fibres via an electrospinning technique", Nanotechnology 13 (2002) 674-677.

* cited by examiner

*Primary Examiner* — Leo B Tentoni
(74) *Attorney, Agent, or Firm* — Clark & Brody

(57) ABSTRACT

The invention relates to a method for producing metal oxide fibers with diameters on the micro- and nanometric scale by using electrospinning. At least one polymer is dissolved in a solvent, a metal salt is dissolved in this polymer solution, and this mixture is subsequently electrospun into fibers. Breaking down the polymer renders metal oxide fibers accessible that can be optionally reduced into the corresponding metal fibers.

10 Claims, 5 Drawing Sheets

2a

2b

2c

3a

3b

3c

4a

4b

4c

PRODUCTION OF METAL NANO- AND MESOFIBERS

Metal wires of the most different metals find currently countless applications in technology. Metal wires are not only of interest due to their high mechanical stability and electrical conductivity, but also due to their inherently high thermal stability, which clearly raises them above synthetics. Thus, metal wires of this type are also of interest for specific applications, e.g. high temperature filters. It is very well known that the filter efficiency increases with decreasing fiber diameter. It is precisely this which comprises the limitations for metal wires, as technologically producible metal wires are only available in diameters of several micrometers (e.g. Baeker company, FIG. 5, which is a picture of metal fibers from the Baeker company from a scanning electron microscope).

It would be particularly interesting to produce metal fibers with diameters in the range of submicrometers with the help of the technologically established electrospinning. Electrospinning definitely represents one of the most important current methods in science and technology for the production of polymer nanofibers. In electrospinning, fundamentally, a polymer melt or polymer solution is exposed to a high electric field at an edge serving as an electrode. Due to the electrostatic charge of the polymer melt or polymer solution resulting thereby, a material flow directed towards the counter electrode, which hardens on the way, occurs. According to electrode geometries, so-called nonwovens or ensambles of ordered fibers are obtained. While until now only fibers with diameters considerably greater than 1,000 nm are obtained with polymer melts, fibers with diameters of 5 nm are suitable for being produced from polymer solutions. Fibers with diameters of less than 1,000 nm are technically of particular interest, e.g. for filtration applications. First trials of electrospinning of metal melts and mixtures of metal/polymer melts were unsuccessful and fail due to fundamental problems, which are currently unsolvable with the creation of a suitable electrical field in the case of pure metals.

Currently, metal fibers in the range of submicrometers are not known. A Chinese paper reports on the production of copper oxide fibers through electrospinning polymer/metal salt solutions.

1. H. Guan, C. Shao, B. Chen, J. Gong, X. Yang; Inorganic Chemistry 2003, 6, 1409-1411
2. X. Yang, C. Shao, H. Guan, X. Li, J. Gong, Inorganic Chemistry 2004, 7, 176-178
3. C. Shao, X. Yang, H. Guan, Y. Liu, J. Gong, Inorganic Chemistry 2004, 7, 625-627

In these methods sols of polymers and metal salts are produced, in which the ratio of polymer: metal ranges between 7:1 and 5:1, i.e. the polymer has to be used in a relatively high excess. Furthermore, these methods require that the fibers obtained through electrospinning from polymer and metal salt are initially dried in vacuo for several hours and, subsequently, calcined at high temperatures, again for several hours. The production of metal fibers is not possible with this method.

The present invention, however, provides a method which allows the use of polymer and metal in a ratio of 3:1 to 1:1 (w/w). Furthermore, the method according to the present invention does not require any drying of the fibers obtained through electrospinning the polymer and metal salt and the degradation of the polymer part of these fibers is achieved in less time, as well as with less effort.

AIM OF THE INVENTION

It is the aim of the invention to provide an improved method for the production of metal oxide fibers through electrospinning with diameters in the range of micro- and nanometers.

A further aim is the reduction of the metal oxide fibers produced with the method according to the present invention to metal fibers.

SOLUTION OF THIS AIM

The aim to provide an improved method for the production of metal oxide fibers with diameters in the range of micro- and nanometers through electrospinning is achieved according to the present invention, in that mixtures of at least one polymer and at least one metal salt are electrospun in a solvent, wherein subsequently the following steps are carried out:
  Production of a solution of the at least one polymer and the at least one metal salt in a solvent, wherein the ratio polymer: metal ranges between 3:1 and 1:1 (w/w),
  electrospinning of this mixture into fibers,
  removal of the polymer.

Surprisingly, it was found that metal oxide fibers with diameters in the range of micro- and nanometers are suitable for being produced, in that mixtures of at least one polymer and at least one metal salt are electrospun in a solvent into fibers with a ratio polymer: metal equal to 3:1 to 1:1 (w/w) and the polymer is subsequently removed. For the production of the mixture, the at least one polymer is initially dissolved in the solvent. Subsequently, the at least one metal salt is added in solid form to this solution and dissolved therein. The ratio of the mass of the at least one polymer to the mass of the at least one metal in the at least one metal salt is hereby understood to be the ratio between polymer and metal.

The at least one polymer is a material which is degradable thermally, chemically, radiation-chemically, physically, biologically, using plasma, ultrasound or extraction with a solvent. This comprises for instance, but not exhaustively, polyester, polyether, polyolefins, polyethylene oxides, polyvinyl alcohols, polyvinyl acetates, polycarbonates, polyurethanes, natural polymers, polylactides, polyglycosides, poly-alpha-methylstyrenes and/or polyacrylonitriles.

The at least one metal salt is an inorganic or organic salt of metals selected from the group Cu, Ag, Au, Ti, Zr, Hf, V, Nb, Ta, Cr, Mo, W, Mn, Re, Fe, Ru, Ni, Pd, Co, Rh, Ir. Inorganic salts in the sense of the present invention are for instance chlorides, sulfates and nitrates, provided that these combinations of inorganic anions and the corresponding metal cations are present.

Organic salts are understood to be salts of carboxylic acids, such as formiates, acetates and stearates, provided that combinations of organic anions and the corresponding metal cations are present.

According to the present invention, the solvent is selected in such a way that both the at least one polymer and the at least one metal salt are soluble therein. That the at least one polymer and the at least one metal salt comprise a solubility of at least 1 wt.-% in the corresponding solvent is hereby meant with soluble.

It is known to persons skilled in the art that the polarities of the at least one polymer, the at least one metal salt and the solvent have to be adjusted to each other. Persons skilled in the art are able to proceed using their general knowledge and without leaving the scope of protection of the patent claims.

Suitable solvents are for instance, but not exhaustively:
  water, aliphatic alcohols, for instance methanol, ethanol, n-propanol, 2-propanol, n-butanol, isobutanol, tert.-butanol, cyclohexanol, carboxylic acids which are liquid at room temperature, for instance formic acid, acetic acid, trifluoroacetic acid amines, for instance diethylamine, di-isopropylamine, phenylethylamine, polar aprotic solvents, for instance acetone, acetylacetone, acetonitrile, acetic acid ethyl ester, diethyleneglycol, formamide, dimethylformamide (DMF), dimethylsulfoxide (DMSO), dimethylacetamide, N-methylpyrrolidone (NMP), pyridine, benzylalcohol, halogenated hydrocarbons, for instance dichloromethane, chloroform, non-polar aliphatic solvents, for instance alkanes, selected from hexane, heptane, octane and cycloalkanes, selected from cyclopentane, cyclohexane, cycloheptane, non-polar aromatic solvents, for instance benzene, toluene.

The aim to reduce the metal oxide fibers produced with the method according to the present invention to metal fibers is solved according to the present invention through reduction with a reducing agent.

It is known to persons skilled in the art how metal oxides are reduced to the corresponding metals. Suitable reducing agents are, for example, hydrogen, carbon monoxide, gaseous hydrocarbons, carbon, further metals, which are less noble, i.e. comprise a more negative standard potential as the metal to be reduced, and further, sodium borohydride, lithium aluminum hydride, alcohols and aldehydes. Alternatively, the metal oxide fibers are suitable for being electrochemically reduced. Persons skilled in the art are able to apply these reduction methods using their general knowledge and without leaving the scope of protection of the patent claims.

The metal fibers and the metal oxide fibers comprise diameters from 10 nm to 5 μm and lengths from 50 μm up to several mm or cm.

Thus, the most varied possibilities for the production of different metal oxide fibers and metal fibers result based on the electrospinning of polymer/metal compound/solvent and, if required, subsequent reduction.

Particularly remarkable in this approach is the direct conversion of the metal-salt-containing polymer fibers into metal fibers, which are not synthesized from metal nanoparticles and, furthermore, are formed without previous conversion into metal oxide fibers.

Nanomaterials comprise a variety of interesting magnetic, electrical and catalytic charateristics. They are, hence, very promising new materials for joining and functional components in microelectronics and optoelectronics. Numerous possibilities also result for applications in catalysis and filtration.

PRACTICAL EMBODIMENTS

1. Production of PVB-Copper-(II)-Nitrate Fibers, Cu-(II)-Oxide Fibers and Fibers from Elementary Copper The basic solution of 5% PVB+20% $Cu(NO_3)_2 \cdot 3H_2O$ (PVB:Cu=1:1) was electrospun under the following conditions: E=25 kV; distance between electrodes 20 cm; supply 1.5 ml/h The thus obtained PVB-$Cu(NO_3)_2$ fibers were subsequently pyrolized (2 h.; 550° C.; air atmosphere)

Hereby, CuO fibers are obtained.

The Cu fibers were produced through reduction of CuO fibers (2 h.; 300° C.; hydrogen atmosphere).

SEM pictures were taken of all three fibers (6 pictures with 10,000 magnification). With these pictures the diameter of the fibers was measured (50 measurements of each material).

The measurement results are summarized in table 1.

TABLE 1

| Material | Fiber diameter (average from 50 measurements) (μm) | standard deviation (μm) | diameter of the thinnest fiber (μm) | diameter of the thickest fiber (μm) |
|---|---|---|---|---|
| PVB-$Cu(NO_3)_2$ fibers | 0.554 | 0.269 | 0.173 | 1.786 |
| CuO fibers | 0.483 | 0.143 | 0.212 | 0.761 |
| Cu fibers | 0.274 | 0.158 | 0.081 | 0.672 |

Figure 1:
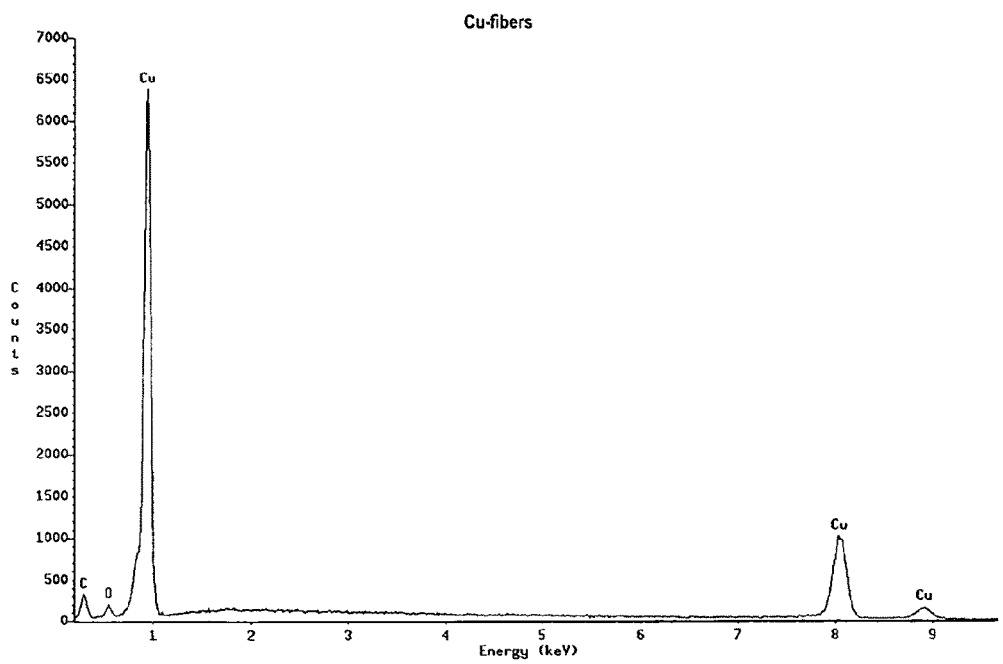
FIG. 1 shows an energy dispersive X-ray analysis of the Cu fibers.

2. Production of PVB-Cobalt-(1)-Nitrate-Fibers, Co-(II)-Oxide-Fibers and Fibers from Elementary Cobalt The basic solution of 5% PVB+25% $Co(NO_3)_2 \cdot 6H_2O$ (PVB:Co=1:1) was electrospun under the following conditions: E=25 kV; distance between electrodes 20 cm; supply 1.5 ml/h The thus obtained PVB-$Co(NO_3)_2$ fibers were subsequently pyrolized (2 h; 550° C.; air atmosphere)

Hereby, CoO fibers are obtained.

The Co fibers were produced through reduction of CoO fibers (2 h; 500° C.; hydrogen atmosphere).

SEM pictures were taken of all three fibers (6 pictures with 10,000 magnification). With these pictures the diameter of the fibers was measured (50 measurements of each material).

The measurement results are summarized in table 2.

Figure 3:
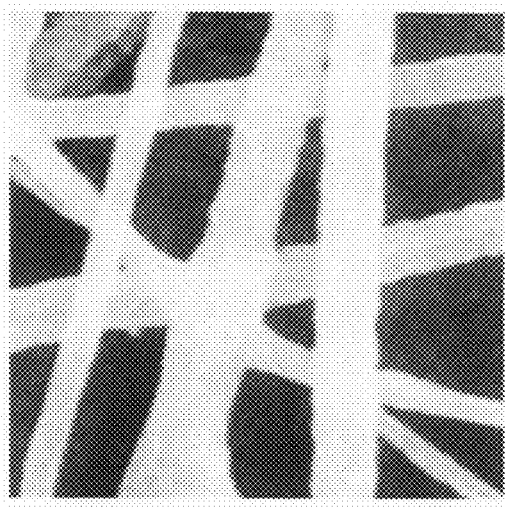
Figure 3:
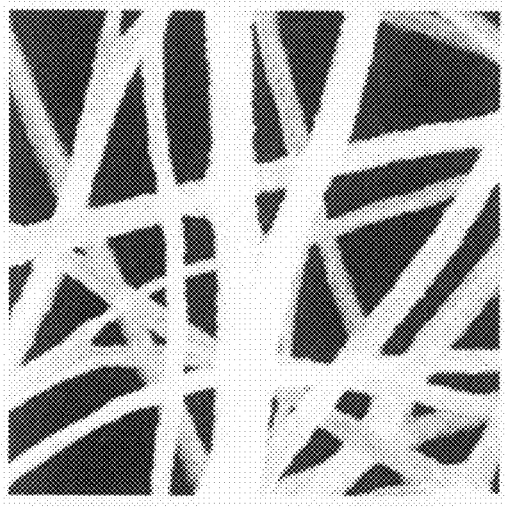
Figure 3:
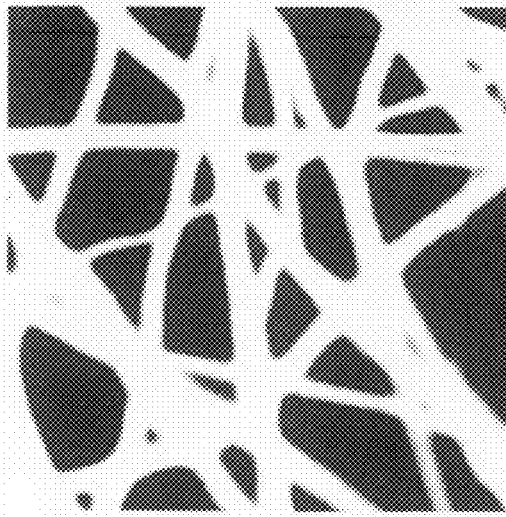

The fibers are depicted in FIG. 3.

TABLE 2

| Material | Fiber diameter (average from 50 measurements) (μm) | standard deviation (μm) | diameter of the thinnest fiber (μm) | diameter of the thickest fiber (μm) |
|---|---|---|---|---|
| PVB-$Co(NO_3)_2$ fibers | 0.725 | 0.232 | 0.293 | 1.294 |
| CoO fibers | 0.339 | 0.119 | 0.108 | 0.655 |
| Co fibers | 0.329 | 0.103 | 0.120 | 0.568 |

3. Production of PVB-nickel-(II)-Nitrate Fibers, Ni-(II)-Oxide Fibers and Fibers from Elementary Nickel The basic solution of 5% PVB+25% $Ni(NO_3)_2 \cdot 6H_2O$ (PVB:Ni=1:1) was electrospun under the following conditions:E=25 kV; distance between electrodes 20 cm; supply 1.5 ml/h The thus obtained PVB-$Ni(NO_3)_2$ fibers were subsequently pyrolized (2 h; 550° C.; air atmosphere)

Hereby, NiO fibers are obtained.

The Ni fibers were produced through reduction of NiO fibers (2 h; 550° C.; hydrogen atmosphere).

SEM pictures were taken of all three fibers (6 pictures with 10,000 magnification). With these pictures the diameter of the fibers was measured (50 measurements of each material).

Figure 4:
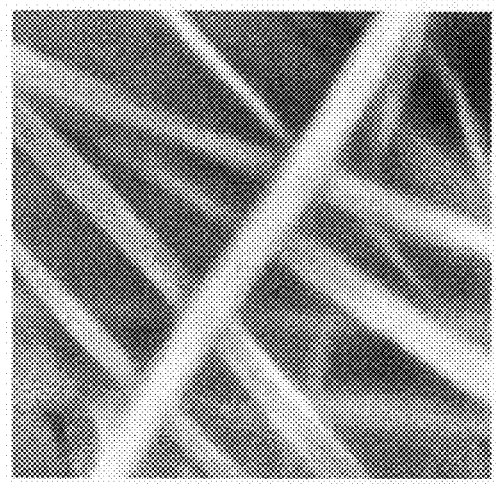
Figure 4:
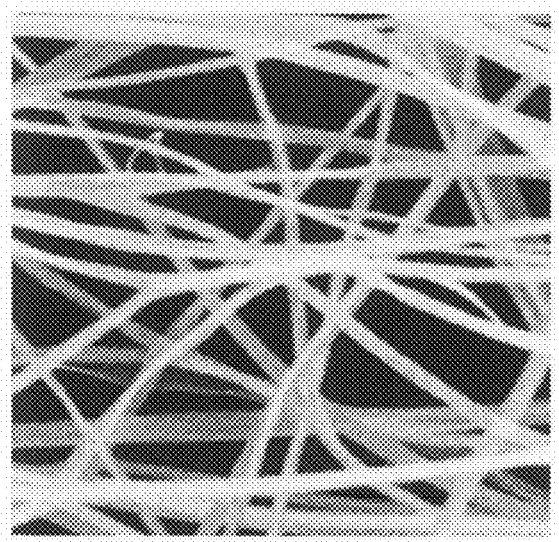
Figure 4:
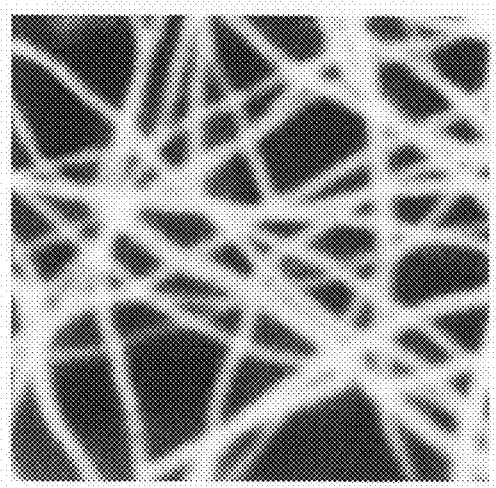

The measurement results are summarized in table 3.
The fibers are depicted in FIG. 4.

TABLE 3

| Material | Fiber diameter (average from 50 measurements) (μm) | standard deviation (μm) | diameter of the thinnest fiber (μm) | diameter of the thickest fiber (μm) |
|---|---|---|---|---|
| PVB-Ni(NO$_3$)$_2$ fibers | 0.477 | 0.190 | 0.135 | 0.943 |
| NiO fibers | 0.228 | 0.096 | 0.078 | 0.554 |
| Ni fibers | 0.238 | 0.082 | 0.138 | 0.552 |

FIGURE LEGEND

Figure 2:
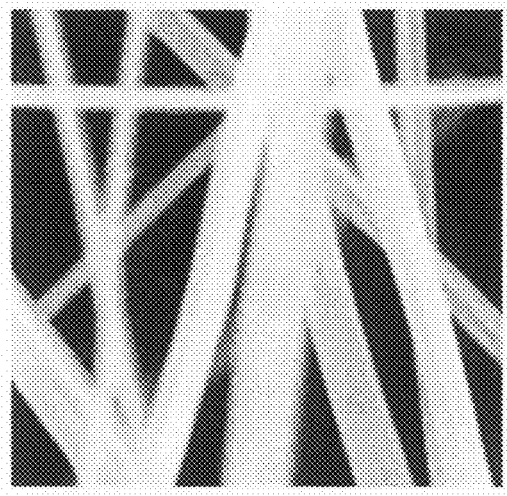
FIG. 2 shows PVB-$Cu(NO_3)_2$ fibers, CuO fibers and Cu fibers.
Figure 2:
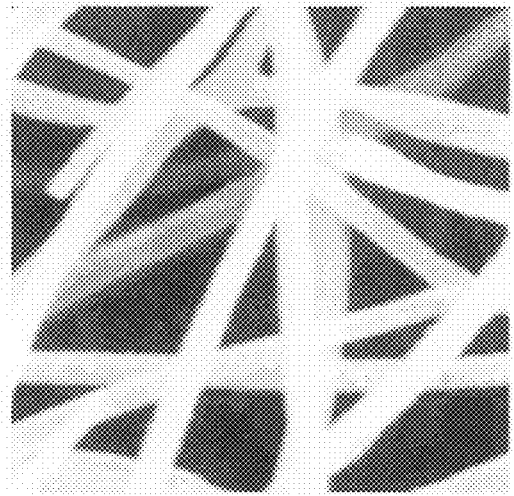
Figure 2:
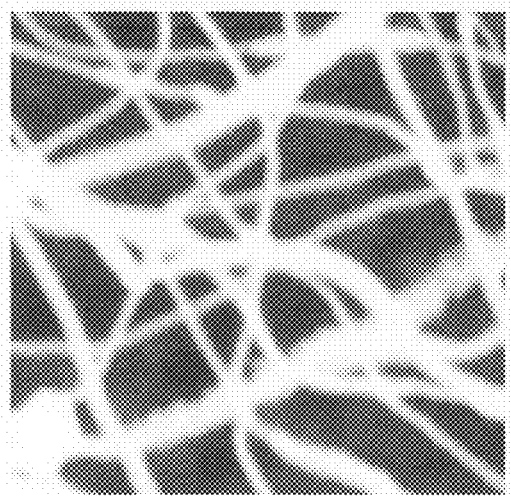
Figure 5:
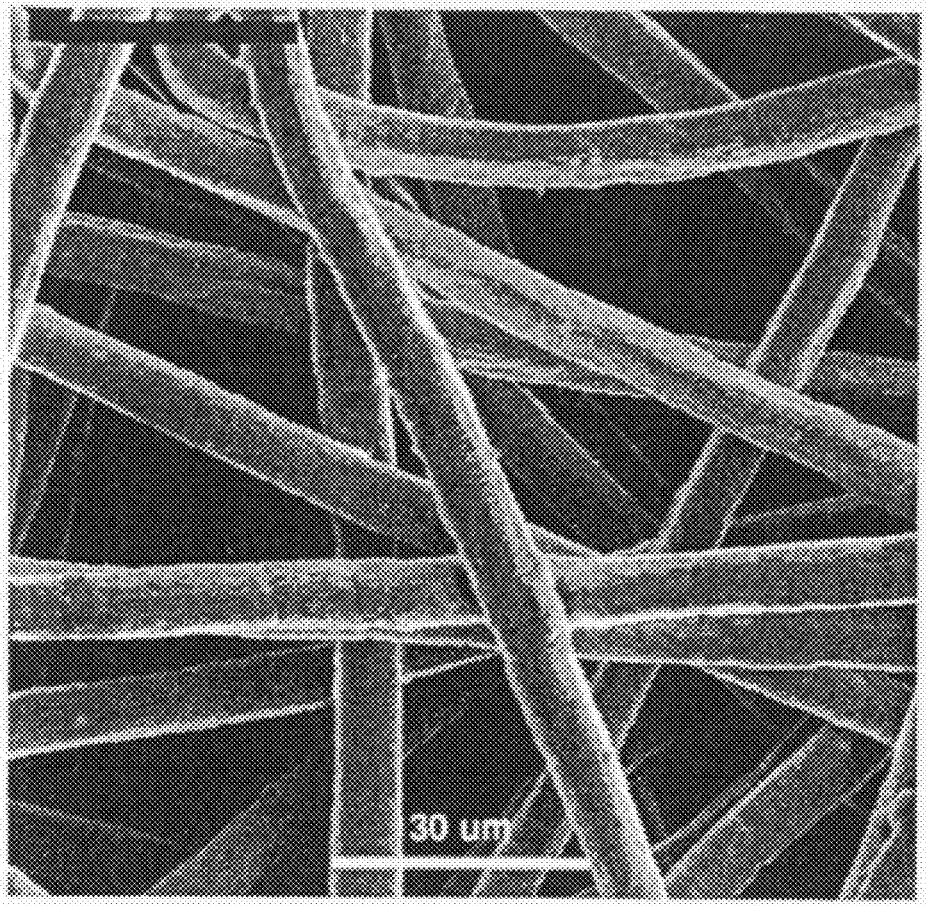

FIG. 1:
Energy dispersive X-ray analysis of the copper fibers produced
FIG. 2:
Polymer-Cu(NO$_3$)$_2$ fibers, CuO fibers and Cu fibers,
3a: PVB-Cu(NO$_3$)$_2$ fibers
3b: CuO fibers
3c: Cu fibers
FIG. 3:
Polymer-Co(NO$_3$)$_2$ fibers, CoO fibers and Co fibers,
3a: PVB-Co(NO$_3$)$_2$ fibers
3b: CoO fibers
3c: Co fibers
FIG. 4:
Polymer-Co(NO$_3$)$_2$ fibers, NiO fibers and Ni fibers,
3a: PVB-Ni(NO$_3$)$_2$ fibers
3b: NiO fibers
3c: Ni fibers
FIG. 5:
Picture of metal fibers

The invention claimed is:

1. Method for the production of metal oxide fibers with diameters in the range of micro- or nanometers through electrospinning of mixtures of at least one polymer and at least one metal salt in a solvent, wherein subsequently the following steps are carried out:
   production of a solution of the at least one polymer and the at least one metal salt in a solvent, wherein the ratio polymer to metal ranges between 3:1 and 1:1 (w/w), and wherein the at least one metal salt is an inorganic or organic salt of a metal selected from the group consisting of Cu, Ag, Au, Zr, Hf, V, Nb, Ta, Cr, Mo, W, Mn, Re, Fe, Ru, Ni, Pd, Co, Rh, Ir,
   electrospinning of this mixture into fibers,
   removal of the polymer.
2. Method according to claim 1, wherein the at least one polymer is a degradable material.
3. Method according to claim 2, wherein at least one polymer is selected from the group comprising polyester, polyether, polyolefins, polyethylene oxides, polyvinyl alcohols, polyvinyl acetales, polycarbonates, polyurethanes, natural polymers, polylactides, polyglycosides, poly-alpha-methylstyrene and / or polyacrylonitrile.
4. Method according to claim 1, wherein furthermore the at least one metal salt is a chloride, sulphate, nitrate or acetate.
5. Method according to claim 1, wherein furthermore the at least one metal salt is the salt of an organic carboxylic acid selected from the group formiate, acetate, and stearates.
6. Method according to claim 1, wherein the solvent is selected from the group water, methanol, ethanol, n-propanol, 2-propanol, n-butanol, isobutanol, tert.-butanol, cyclohexanol, formic acid, acetic acid, trifluoroacetic acid, diethylamine, di-isopropylamine, phenylethylamine, acetone, acetylacetone, acetonitrile, acetic acid ethyl ester, diethyleneglycol, formamide, dimethylformamide (DMF), dimethylsulfoxide (DMSO), di methylacetamide, N-methylpyrrolidone (NMP), pyridine, benzylalcohol, dichloromethane, chloroform, hexane, heptane, octane, cyclopentane, cycloheptane, benzene, toluene.
7. Method according to claim 1, wherein the solvent is selected from the group water, methanol, ethanol, isopropanol.
8. Method according to claim 1 wherein the removal of the at least one polymer is carried thermally, chemically, radiation-chemically, physically, biologically, using plasma, ultrasound or extraction with a solvent.
9. Method according to claim 1, wherein after removal of the polymer a reduction of the metal oxide fibers to the corresponding metal fibers occurs.
10. Method according to claim 9, wherein the reduction of the metal oxide fibers to the corresponding metal fibers occurs with the help of a reducing agent selected from the group hydrogen, carbon monoxide, gaseous hydrocarbons, carbon, a metal with lower standard potential than the metal to be reduced, sodium borohydride, lithium aluminium hydride, alcohols, aldehydes.

* * * * *